United States Patent
Wang et al.

(10) Patent No.: US 12,174,376 B2
(45) Date of Patent: Dec. 24, 2024

(54) OPTICAL SYSTEM, ILLUMINATION SYSTEM, AND DISPLAY SYSTEM

(71) Applicant: HUAWEI TECHNOLOGIES CO., LTD., Shenzhen (CN)

(72) Inventors: Jinlei Wang, Dongguan (CN); Shimao Li, Shenzhen (CN); Han Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/526,319

(22) Filed: Dec. 1, 2023

(65) Prior Publication Data
US 2024/0103269 A1    Mar. 28, 2024

Related U.S. Application Data (63) Continuation of application No. PCT/CN2022/079474, filed on Mar. 7, 2022.

(30) Foreign Application Priority Data

Jun. 2, 2021 (CN) .................. 202110615792.3

(51) Int. Cl.
| | | |
|---|---|---|
| *G02B 27/01* | (2006.01) | |
| *G02B 5/30* | (2006.01) | |
| *G02B 27/09* | (2006.01) | |
| *G02B 27/10* | (2006.01) | |
| *G02B 27/28* | (2006.01) | |

(52) U.S. Cl.
CPC ....... *G02B 27/0101* (2013.01); *G02B 5/3083* (2013.01); *G02B 27/0955* (2013.01); *G02B 27/1046* (2013.01); *G02B 27/283* (2013.01); *G02B 2027/0136* (2013.01)

(58) Field of Classification Search
None
See application file for complete search history.

(56) References Cited

U.S. PATENT DOCUMENTS

2019/0391473 A1* 12/2019 Uchiyama .......... G03B 21/2073
2020/0379248 A1* 12/2020 Ichihashi ........... G02B 27/0905

* cited by examiner

*Primary Examiner* — Christopher J Kohlman
(74) *Attorney, Agent, or Firm* — HAUPTMAN HAM, LLP (57) ABSTRACT

An optical system. A light source component generates a light beam. A light adjustment component adjusts a ratio of the S-polarized light and a ratio of the P-polarized light in the light beam. A first polarization beamsplitter mirror component splits a light beam adjusted by the light adjustment component into a first light beam and a second light beam, where the first light beam is a light beam of the S-polarized light, and the second light beam is a light beam of the P-polarized light. The first lens component projects the first light beam or a modulated first light beam to a first region. The second lens component projects the second light beam or a modulated second light beam to a second region.

20 Claims, 6 Drawing Sheets

OPTICAL SYSTEM, ILLUMINATION SYSTEM, AND DISPLAY SYSTEM

CROSS-REFERENCE TO RELATED APPLICATIONS

This application is a continuation of International Application No. PCT/CN2022/079474, filed on Mar. 7, 2022, which claims priority to Chinese Patent Application No. 202110615792.3, filed on Jun. 2, 2021. The disclosures of the aforementioned applications are hereby incorporated by reference in their entireties.

BACKGROUND

In conventional technologies, a light source in a multi-lens optical system generates light beams, and a light beam allocated to each lens in a plurality of lenses is fixed and nonadjustable, causing inconvenience in actual application scenarios. For example, in a projection scenario, consistency between intensities of light projected by a plurality of lenses is typically implemented through designing or assembling. This raises challenges to assembly of the multi-lens optical system, and causes inconsistency between intensities of the light projected by the plurality of lenses in the projection scenario due to device loss.

SUMMARY

To overcome the foregoing problem, embodiments described herein provide an optical system, an illumination system, a head-up display system, and a display system, to implement dynamic adjustment of a split ratio for a plurality of lenses in a multi-lens optical system.

According to a first aspect, at least one embodiment provides an optical system. The optical system includes at least a light source component, a light adjustment component, a first polarization beamsplitter mirror component, a first lens component, and a second lens component. The light source component is configured to generate a light beam including S-polarized light and P-polarized light. The light adjustment component is configured to adjust a ratio of the S-polarized light and a ratio of the P-polarized light in the light beam. The first polarization beamsplitter mirror component is configured to split a light beam adjusted by the light adjustment component into a first light beam and a second light beam, where the first light beam is a light beam of the S-polarized light, and the second light beam is a light beam of the P-polarized light. The first lens component is configured to project the first light beam or a modulated first light beam to a first region. The second lens component is configured to project the second light beam or a modulated second light beam to a second region.

In the optical system provided in at least one embodiment, a light adjustment component is arranged between a light source component and a lens component, so that split ratios in which a light beam generated by a light source of a multi-lens optical system is allocated to a plurality of lenses are dynamically adjustable.

In at least one embodiment, the light adjustment component includes at least a birefringent crystal that changes an intensity of the S-polarized light and an intensity of the P-polarized light. The birefringent crystal is rotatable around an axis, such that the intensity of the S-polarized light and the intensity of the P-polarized light are changed.

Optionally, the birefringent crystal is a half-wave plate. The half-wave plate is configured to rotate around a rotation axis, and the rotation axis coincides with an optical axis of the light beam.

The rotatable half-wave plate is an implementation of the light adjustment component. The half-wave plate is rotated to adjust the ratio of the S-polarized light and the ratio of the P-polarized light in the light beam. This simplifies a structure of the optical system and reduces system costs while the split ratios in which the light beam generated by the light source of the multi-lens optical system is allocated to the plurality of lenses are dynamically adjustable.

In at least one embodiment, the optical system further includes a first spatial light modulator and a second spatial light modulator. The first spatial light modulator is configured on an optical path between the first lens component and the first polarization beamsplitter mirror component, and is configured to modulate the first light beam. The first lens component projects the modulated first light beam to the first region to form a first image. The second spatial light modulator is configured on an optical path between the second lens component and the first polarization beamsplitter mirror component, and is configured to modulate the second light beam. The second lens component projects the modulated second light beam to the second region to form a second image.

The optical system provided in at least one embodiment is used in an implementation of a projection scenario. The split ratios in which the light beam generated by the light source is allocated to the plurality of lenses are dynamically adjustable, so that inconsistency between intensities of light projected by the plurality of lenses is resolved.

In at least one embodiment, the first region is adjacent to or partially overlaps the second region. The first image and the second image are spliced to form a projection image.

In the optical system provided in at least one embodiment, a multi-lens projection splicing manner is used. In this way, technical effects of reducing design difficulty and costs of lenses are achieved while display of large-format projection is ensured in an environment with a limited operation distance.

In at least one embodiment, the optical system further includes a screen, where the first region and the second region are located in a same region of the screen. The first image is a polarized light image for the left eye of a user, and the second image is a polarized light image for the right eye of the user, thereby implementing 3D display of the projection image.

In at least one embodiment, the optical system further includes a cylindrical lens component, and a focal plane of the cylindrical lens component coincides with a plane in which the screen is located, thereby implementing an autostereoscopy display effect of the projection image.

In at least one embodiment, the optical system further includes a slit grating component, where a plane in which the slit grating component is located is parallel to a plane in which the screen is located, and there is a preset distance between the slit grating component and the screen, so that the left eye of the user sees the first image through a slit of the slit grating, and the right eye of the user sees the second image through the slit of the slit grating.

In at least one embodiment, the first spatial light modulator is a transmissive spatial light modulator or a reflective spatial light modulator, and the second spatial light modulator is a transmissive spatial light modulator or a reflective spatial light modulator. Optionally, the transmissive spatial light modulator is an LCD, and the reflective spatial light modulator is an LCOS, a DLP, or an MEMS.

In at least one embodiment, the first spatial light modulator is a first LCD, and the second spatial light modulator is a second LCD. A reflective element is arranged between the first polarization beamsplitter mirror component and the second LCD, and is configured to reflect the second light beam to the second LCD.

In at least one embodiment, the first spatial light modulator is a first LCoS, and the second spatial light modulator is a second LCoS. A light polarization direction conversion element and a second polarization beamsplitter mirror component are sequentially arranged between the first polarization beamsplitter mirror component and the second LCoS. The light polarization direction conversion element is configured to convert the P-polarized light of the second light beam to the S-polarized light. The second polarization beamsplitter mirror component is configured to reflect the S-polarized light to the second LCoS, and transmit the P-polarized light to the second lens component.

Optionally, the light polarization direction conversion element is a half-wave plate.

In at least one embodiment, the first lens component is an illumination lens component, and is configured to project the first light beam to the first region to illuminate the first region; and/or the second lens component is an illumination lens component, and is configured to project the second light beam to the second region to illuminate the second region.

According to a second aspect, at least one embodiment provides an illumination system, including the optical system in the first aspect.

According to a third aspect, at least one embodiment provides a head-up display system, including the optical system in the first aspect and an imaging reflective mirror component. The imaging reflective mirror component is configured to reflect, to a preset region, the light beam generated by the optical system.

In at least one embodiment, the imaging reflective mirror component includes a first reflective mirror element and a second reflective mirror element, and the first reflective mirror element and the second reflective mirror element are configured to reflect the light beam emitted by the optical system to a surface of a windshield.

According to a fourth aspect, at least one embodiment provides a display system, including the optical system in the first aspect and an imaging reflective mirror component. The imaging reflective mirror component is configured to reflect, to a preset region, the light beam generated by the optical system.

In at least one embodiment, the imaging reflective mirror component includes a third reflective mirror element, a fourth reflective mirror element, and a curved mirror element, and the third reflective mirror element, the fourth reflective mirror element, and the curved mirror element are configured to reflect the light beam emitted by the optical system to an eye of a user.

According to a fifth aspect, at least one embodiment further provides a vehicle, including the optical system in the first aspect, and/or the illumination system in the second aspect, and/or the head-up display system in the third aspect, and/or the display system in the fourth aspect.

BRIEF DESCRIPTION OF DRAWINGS

The following briefly describes the accompanying drawings used for describing the embodiments or the conventional technologies.

DESCRIPTION OF EMBODIMENTS

The following describes the technical solutions in embodiments described herein with reference to the accompanying drawings in at least one embodiment.

In the descriptions of at least one embodiment, directions or position relationships indicated by the terms "center", "up", "down", "front", "rear", "left", "right", "vertical", "horizontal", "top", "bottom", "inside", "outside", and the like are based on the directions or position relationships shown in the accompanying drawings, and are merely intended to describe at least one embodiment and simplify the descriptions, but are not intended to indicate or imply that an apparatus or a component shall have a specific direction or be formed and operated in a specific direction, and therefore shall not be understood as a limitation of at least one embodiment.

In the descriptions of at least one embodiment, unless otherwise specified and limited explicitly, the terms "mounting", "connected", and "connection" shall be understood in a general manner, for example, is a fixed connection, a detachable connection, an abutting connection, or an integrated connection; and a person of ordinary skill in the art understands meanings of the terms in at least one embodiment according to situations.

Figure 1:
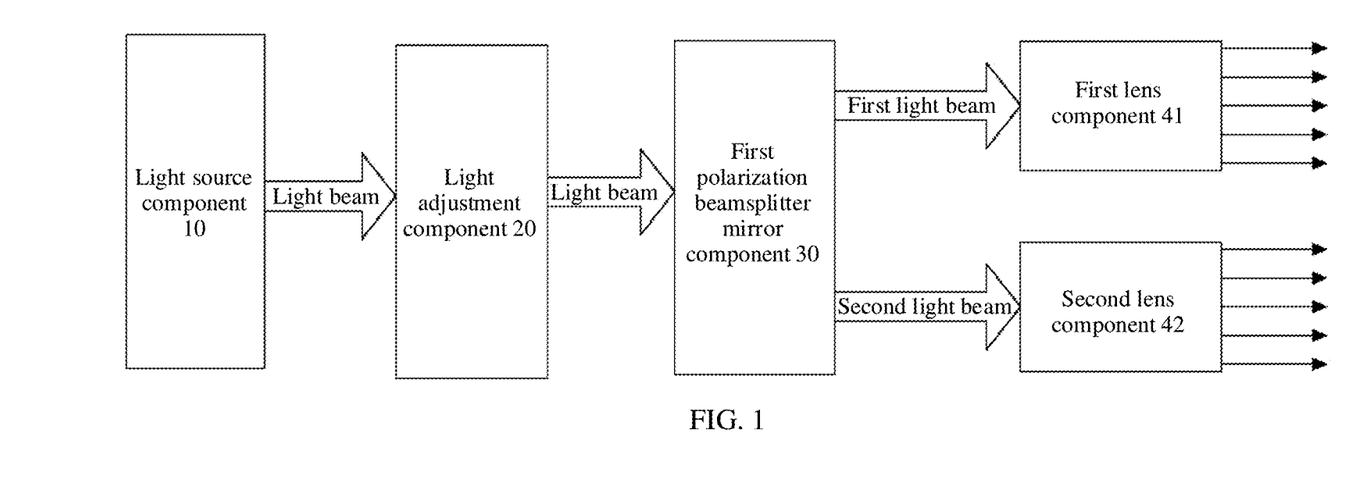
FIG. 1 is a schematic diagram of a structure of an optical system according to at least one embodiment.

FIG. 1 is a schematic diagram of a structure of an optical system according to at least one embodiment. As shown in FIG. 1, the optical system includes at least a light source component 10, a light adjustment component 20, a first polarization beamsplitter mirror component 30, a first lens component 41, and a second lens component 42. The light source component 10 is configured to generate a light beam including S-polarized light and P-polarized light. The light adjustment component 20 is configured to adjust a ratio of the S-polarized light and a ratio of the P-polarized light in the light beam. The first polarization beamsplitter mirror component 30 is configured to split a light beam adjusted by the light adjustment component 20 into a first light beam and a second light beam, where the first light beam is a light beam of the S-polarized light, and the second light beam is a light beam of the P-polarized light. The first lens component 41 is configured to project the first light beam or a modulated first light beam to a first region. The second lens component 42 is configured to project the second light beam or a modulated second light beam to a second region.

In the optical system provided in at least one embodiment, a light adjustment component is arranged between a light source component and a lens component, so that split ratios in which a light beam generated by a light source of a multi-lens optical system is allocated to a plurality of lenses are dynamically adjustable.

The light source component 10 in at least one embodiment is configured to emit the light beam including the S-polarized light and the P-polarized light. For example, the light source component includes a light emitting element configured to generate a light beam and a polarizer that polarizes the light beam to a specific direction. The light beam generated by the light emitting element is polarized by the polarizer into the S-polarized light and the P-polarized light, to generate the light beam including the S-polarized light and the P-polarized light.

Optionally, the light emitting element is a semiconductor light emitting element, such as a laser, a light emitting diode (light emitting diode, LED), or other light emitting elements.

The polarizer is an optical device that obtains polarized light from ordinary light, such as a polarizing plate or a Nicol prism.

In an example, the light adjustment component 20 is configured on an optical path between the light source component and the first polarization beamsplitter mirror component, to adjust the ratio of the S-polarized light and the ratio of P-polarized light in the light beam generated by the light source component. For example, the light adjustment component is a half-wave plate rotatable around a rotation axis, and the rotation axis of the half-wave plate coincides with an optical axis of the light beam. A relative phase of two components of the light beam is changed by rotating the half-wave plate, to adjust the ratio of the S-polarized light and the ratio of the P-polarized light.

For example, incident light that is incident on the half-wave plate is $$I_i = \begin{pmatrix} A_i \\ B_i \end{pmatrix},$$

a Jones matrix of the wave plate is $$P = \cos\frac{\beta}{2}\begin{pmatrix} 1 - i\tan\frac{\beta}{2}\cos2\alpha & -i\tan\frac{\beta}{2}\sin2\alpha \\ -i\tan\frac{\beta}{2}\sin2\alpha & 1 + i\tan\frac{\beta}{2}\cos2\alpha \end{pmatrix},$$

where $\alpha$ is an included angle between a fast-axis direction of the half-wave plate and a direction of the S-polarized light, a phase delay generated by the half-wave plate is $$\beta = \frac{2\pi}{\lambda}|n_s - n_p|d,$$

$n_s$ and $n_p$ are respectively a refractive index of the S-polarized light and a refractive index of the P-polarized light in a crystal wave plate, and d is a thickness of a crystal. An intensity of emergent light obtained after the incident light is modulated by the wave plate is $$I_o = PI_i = \cos\frac{\beta}{2}\begin{pmatrix} 1 - i\tan\frac{\beta}{2}\cos2\alpha & -i\tan\frac{\beta}{2}\sin2\alpha \\ -i\tan\frac{\beta}{2}\sin2\alpha & 1 + i\tan\frac{\beta}{2}\cos2\alpha \end{pmatrix}\begin{pmatrix} A_i \\ B_i \end{pmatrix} =$$

$$\begin{pmatrix} A_o \\ B_o \end{pmatrix} = \begin{pmatrix} \cos\frac{\beta}{2}\left[\left(1 - i\tan\frac{\beta}{2}\cos2\alpha\right)A_i - \left(i\tan\frac{\beta}{2}\sin2\alpha\right)B_i\right] \\ \cos\frac{\beta}{2}\left[\left(-i\tan\frac{\beta}{2}\sin2\alpha\right)A_i + \left(1 + i\tan\frac{\beta}{2}\cos2\alpha\right)B_i\right] \end{pmatrix}.$$

After the emergent light emitted from the half-wave plate passes through a polarization beamsplitter mirror or a beamsplitter plate, an intensity of the S-polarized light is $$|A_o| = \left|\cos\frac{\beta}{2}\left[\left(1 - i\tan\frac{\beta}{2}\cos2\alpha\right)A_i - \left(i\tan\frac{\beta}{2}\sin2\alpha\right)B_i\right]\right|,$$

and an intensity of the P-polarized light is $$|B_o| = \left|\cos\frac{\beta}{2}\left[\left(-i\tan\frac{\beta}{2}\sin2\alpha\right)A_i + \left(1 + i\tan\frac{\beta}{2}\cos2\alpha\right)B_i\right]\right|.$$

Therefore, the ratio of the S-polarized light and the ratio of the P-polarized light in the light beam is controlled by controlling a rotation angle of the half-wave plate.

Certainly, the light adjustment component 20 is not limited to an implementation of the half-wave plate rotatable around the rotation axis, and another optical element that adjusts the ratio of the S-polarized light and the ratio of the P-polarized light is selected, for example, a birefringent crystal, a Faraday element, a liquid crystal element, or other optical elements that rotate a polarization direction.

The first polarization beamsplitter mirror component 30 is configured on a transmission path of a light beam emitted by the light adjustment component, and splits the light beam adjusted by the light adjustment component into the first light beam including the S-polarized light and the second light beam including the P-polarized light. For example, the polarization beamsplitter mirror component is a polarization beamsplitter prism. Based on an attribute of the polarization beamsplitter prism to transmit the P-polarized light and reflect the S-polarized light, the light beam adjusted by the light adjustment component is split into the first light beam including the S-polarized light and the second light beam including the P-polarized light.

Certainly, the polarization beamsplitter mirror component 30 is alternatively a polarization beamsplitter plate, or another polarization beamsplitter optical element that reflects the S-polarized light and transmit the P-polarized light. This is not limited in at least one embodiment.

For example, the first lens component 41 and the second lens component 42 include a combination of one or more dioptric optical lenses, and the optical lenses include, for example, a non-planar lens such as a biconcave lens, a biconvex lens, a concave-convex lens, a convex-concave lens, a plano-concave lens, a plano-convex lens, and the like, or various combinations thereof. A type and a variety of the lens component are not limited in at least one embodiment.

The optical system provided in at least one embodiment is used in a plurality of scenarios, such as a projection scenario and an illumination scenario. With reference to FIG. 2 to FIG. 8, the following describes specific solutions in response to the optical system being applied to specific scenarios.

In response to the optical system being used in the projection scenario, the optical system further includes a first spatial light modulator and a second spatial light modulator. The first spatial light modulator is configured on an optical path between the first lens component and the first polarization beamsplitter mirror component, and is configured to modulate the first light beam. The first lens component projects the modulated first light beam to the first region to form a first image. The second spatial light modulator is configured on an optical path between the second lens component and the first polarization beamsplitter mirror component, and is configured to modulate the second light beam. The second lens component projects the modulated second light beam to the second region to form a second image. The optical system provided in at least one embodiment is used in the projection scenario implementation. The split ratios in which the light beam generated by the light source is allocated to the plurality of lenses are dynamically adjustable, so that a problem of inconsistent intensities of light projected by the plurality of lenses is resolved.

The first spatial light modulator and the second spatial light modulator are transmissive spatial light modulators, such as liquid crystal displays (liquid crystal display, LCD) component, or reflective spatial light modulators, such as a liquid crystal on silicon (liquid crystal on silicon, LCoS) component, a digital micromirror display (digital micromirror display, DMD) component, or a micro-electro-mechanical system (micro-electro-mechanical system, MEMS).

Figure 2:
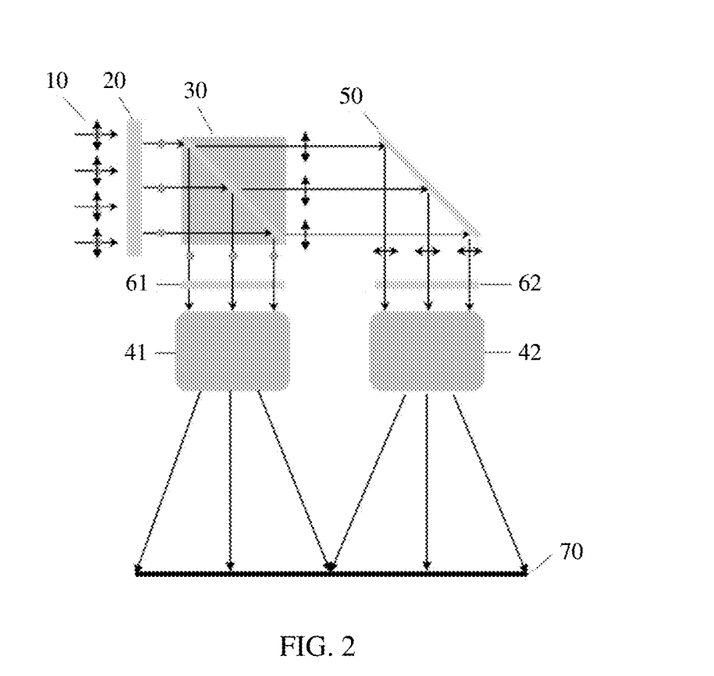
FIG. 2 is a schematic diagram of a structure of an optical system used in a splicing projection scenario according to at least one embodiment.

In an example, the optical system in at least one embodiment implements splicing projection. In response to the first spatial light modulator and the second spatial light modulator being transmissive spatial light modulators (for example, an LCD), a structure of the optical system is shown in FIG. 2. The optical system includes at least a light source component 10, a light adjustment component 20, a first polarization beamsplitter mirror component 30, a reflective element 50, a first LCD 61, a second LCD 62, a first lens component 41, a second lens component 42, and a screen 70.

Both the first lens component 41 and the second lens component 42 are projection lenses. The first LCD 61 is configured on an optical path between the first polarization beamsplitter mirror component 30 and the first lens component 41, to modulate a first light beam. The first lens component 41 projects a modulated first light beam to a first region of the screen 70 to form a first image. The reflective element 50 is configured between the first polarization beamsplitter mirror component 30 and the second LCD 62, and reflects a second light beam to the second LCD 62. The second LCD 62 modulates the second light beam, and a modulated second light beam is projected by the second lens component 42 to a second region of the screen 70 to form a second image. The first region is adjacent to or partially overlaps the second region, so that the first image and the second image are spliced to form a final projection image.

The reflective element is an optical element having at least one reflective surface, such as a planar reflective mirror, a reflective prism, or any optical reflective element having a reflection function.

Figure 3:
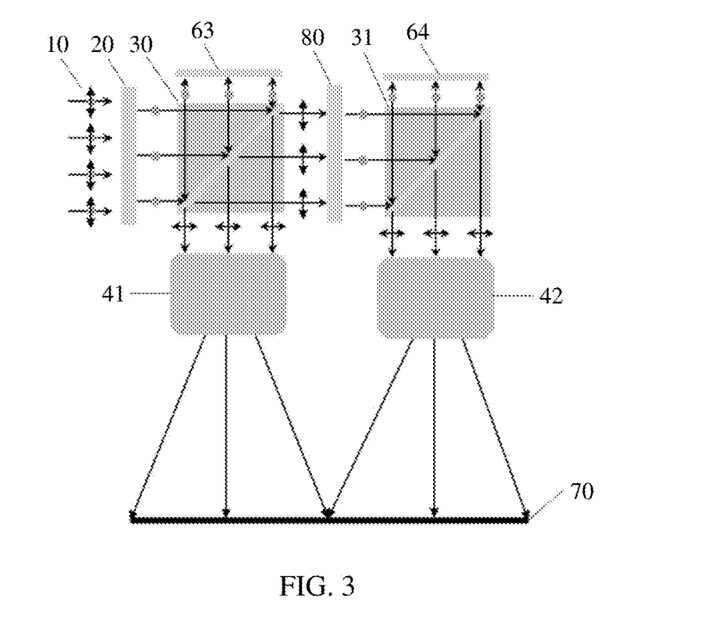
FIG. 3 is a schematic diagram of another structure of an optical system used in a splicing projection scenario according to at least one embodiment.
Figure 4:
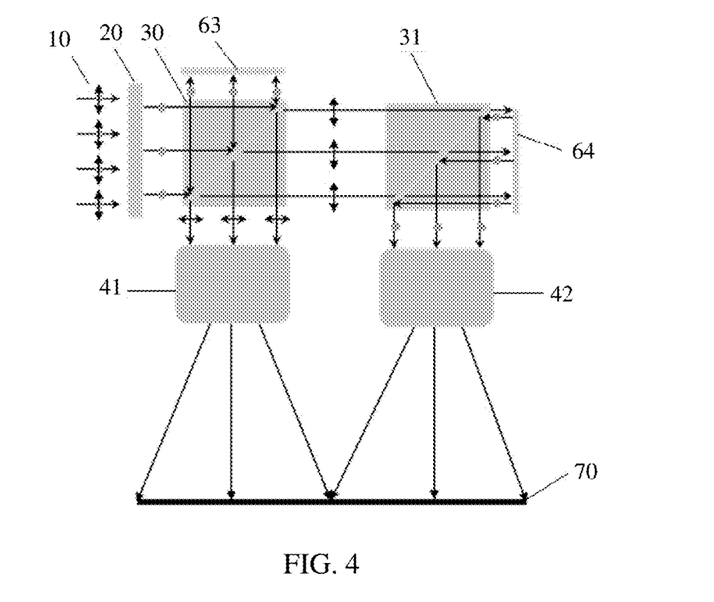
FIG. 4 is a schematic diagram of another structure of an optical system used in a splicing projection scenario according to at least one embodiment.

In response to the first spatial light modulator and the second spatial light modulator being reflective spatial light modulators (for example, an LCoS), a structure of the optical system is shown in FIG. 3. The optical system includes at least a light source component 10, a light adjustment component 20, a first polarization beamsplitter mirror component 30, a light polarization direction conversion element 80, a second polarization beamsplitter mirror component 31, a first LCoS 63, a second LCoS 64, a first lens component 41, a second lens component 42, and a screen 70.

Both the first lens component 41 and the second lens component 42 are projection lenses. The first polarization beamsplitter mirror component 30 reflects S-polarized light to the first LCoS 63, and the first LCoS 63 modulates a first light beam. The first lens component 41 projects a modulated first light beam to a first region of the screen 70 to form a first image. The light polarization direction conversion element 80 is configured on an optical path between the first polarization beamsplitter mirror component 30 and the second polarization beamsplitter mirror component 31, and converts P-polarized light of a second light beam into S-polarized light. The second polarization beamsplitter mirror component 31 reflects, to the second LCoS 64, a light beam that passes through the light polarization direction conversion element 80, and the second LCoS 64 modulates incident S-polarized light. The second lens component 42 projects a modulated second light beam to a second region of the screen 70 to form a second image. The first region is adjacent to or partially overlaps the second region, so that the first image and the second image are spliced to form a final projection image.

Optionally, the light polarization direction conversion element 80 is a half-wave plate that converts the P-polarized light into the S-polarized light, or another optical element rotatable a polarization direction, for example, a Faraday element or a liquid crystal element.

In another example, the optical system alternatively does not include the light polarization direction conversion element 80. The second LCoS 64 is deployed on a transmission path of the second light beam transmitted by the second polarization beamsplitter mirror component 31, to modulate the second light beam. A modulated second light beam is reflected by the second polarization beamsplitter mirror component 31 to the second lens component 42, and the second lens component 42 projects the modulated second light beam to the second region of the screen 70 to form a second image (referring to FIG. 4).

For details of deployment manners and specific structures of the light source component 10, the light adjustment component 20, the first polarization beamsplitter mirror component 30, the first lens component 41, and the second lens component 42, refer to the foregoing descriptions. For brevity, details are not described herein again.

In the optical system provided in at least one embodiment, a multi-lens projection splicing manner is used. On one hand, display of large-format projection is ensured in an environment with a limited operation distance, and on the other hand, technical effect of reducing design difficulty and costs of lenses is implemented.

Figure 5:
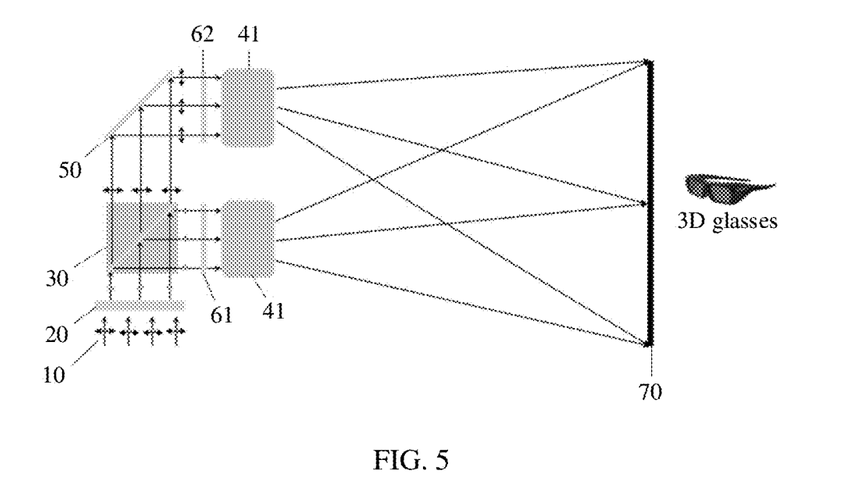
FIG. 5 is a schematic diagram of a structure of an optical system used in a 3D projection scenario according to at least one embodiment.

In another example, the optical system in at least one embodiment implements 3D projection display. In this case, a structure of the optical system is shown in FIG. 5, including a light source component 10, a light adjustment component 20, a first polarization beamsplitter mirror component 30, a reflective element 50, a first LCD 61, a second LCD 62, a first lens component 41, a second lens component 42, and a screen 70.

Both the first lens component 41 and the second lens component 42 are 3D projection lenses. The first LCD 61 is configured on an optical path between the first polarization beamsplitter mirror component 30 and the first lens component 41, to modulate a first light beam to generate polarized light for the left eye of a user. The first lens component 41 projects the polarized light for the left eye of the user to a first region of the screen 70, to form a first image of the polarized light for the left eye of the user. The reflective element 50 is configured between the first polarization beamsplitter mirror component 30 and the second LCD 62, and reflects a second light beam to the second LCD 62. The second LCD 62 modulates the second light beam to generate polarized light for the right eye of the user, and the polarized light for the right eye of the user is projected by the second lens component 42 to a second region of the screen 70 to form a second image of the polarized light for the right eye of the user. The first region and the second region are a same region on the screen, so that the first image of the polarized light for the left eye of the user and the second image of the polarized light for the right eye of the user form a final 3D projection image. Because the first LCD 61 and the second LCD 62 generate images of different polarization directions for the left eye and the right eye, the user obtains the 3D projection image by wearing 3D glasses.

For details of deployment manners and specific structures of the light source component 10, the light adjustment component 20, the first polarization beamsplitter mirror component 30, the first lens component 41, and the second lens component 42, refer to the foregoing descriptions. For brevity, details are not described herein again.

Figure 6:
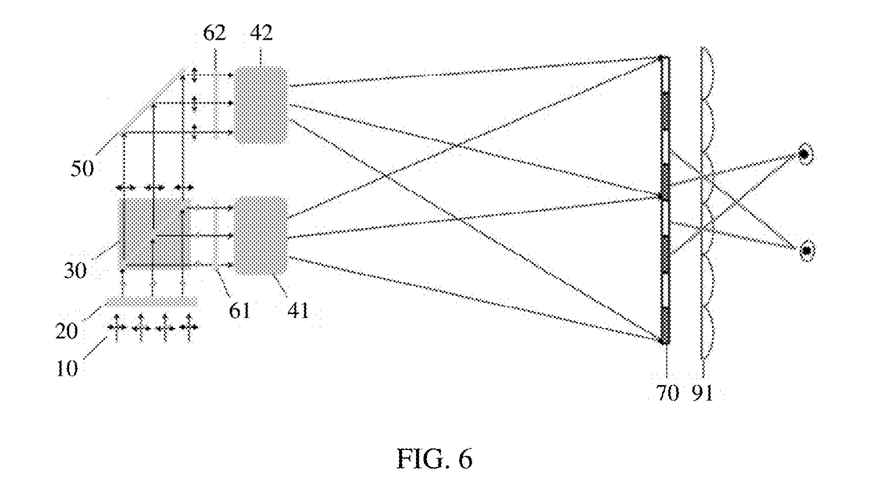
FIG. 6 is a schematic diagram of a structure of an optical system used in an autostereoscopy projection scenario according to at least one embodiment.

In another example, the optical system in at least one embodiment implements autostereoscopy projection display. In this case, a structure of the optical system is shown in FIG. 6. A difference from the optical system in the previous example lies only in that a cylindrical lens component 91 is additionally arranged in front of the screen 70, and a focal plane of the cylindrical lens component 91 coincides with a plane in which the screen is located, to implement autostereoscopy projection display.

For example, the cylindrical lens component 91 is a cylindrical three-dimensional grating, or the cylindrical lens component is replaced with a parallel line grating. A three-dimensional sense is generated through light refraction by the three-dimensional grating in combination with human eyes' parallax and convergence, to implement autostereoscopy effect, and a three-dimensional image effect is easily experienced without the 3D glasses. In addition, advantages such as a high contrast, a high resolution, a high brightness, and low crosstalk are provided, so that a 3D image is more vivid and distinct. A 2D image source and a 3D image source are compatible and are freely switched without difficulty, and a scene is deeper and has more visual impact.

Figure 7:
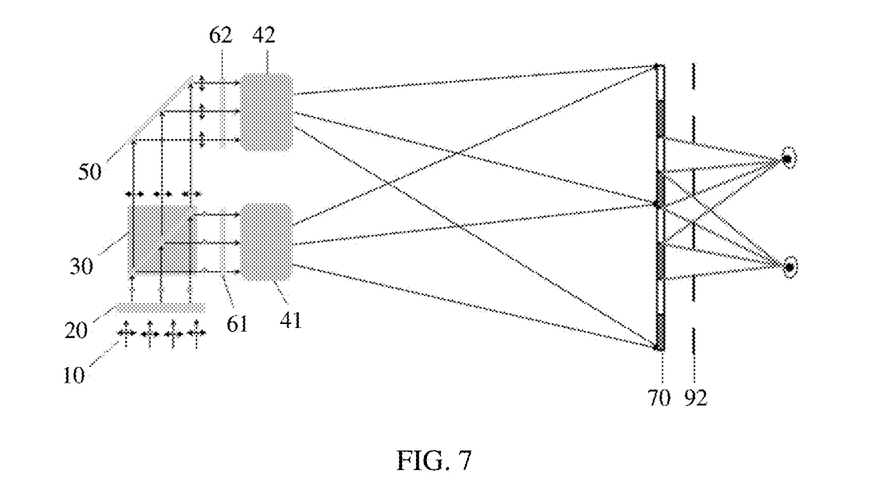
FIG. 7 is a schematic diagram of another structure of an optical system used in an autostereoscopy projection scenario according to at least one embodiment.

In another example, at least one embodiment provides another optical system for implementing autostereoscopy. A structure of the optical system is shown in FIG. 7. A difference from the optical system in the previous example lies only in that a slit grating component 92 is additionally arranged in front of the screen 70, a plane in which the slit grating component 92 is located is parallel to the plane in which the screen 70 is located, and there is a preset distance between the slit grating component 92 and the screen 70, so that the left eye of the user sees the first image for the left eye of the user through a slit of a slit grating, and the right eye of the user sees the second image for the right eye of the user through the slit of the slit grating. In this way, autostereoscopy effects are implemented.

For example, the preset distance between the slit grating component 92 and the screen 70 should satisfy a formula: $Ze=(Pd+Pe)*Zb/Pd$, where $Ze$ indicates a distance between human eyes and the screen, $Pd$ is a display dot pitch, $Pe$ is a distance between two eyes of a viewer, and $Zb$ is the preset distance between the slit grating component 92 and the screen 70.

Certainly, the optical systems shown in FIG. 5 to FIG. 7 are merely examples in which the spatial light modulator is a transmissive spatial light modulator (for example, an LCD), and a spatial light modulator used in response to the optical system in at least one embodiment being used in the projection scenario is not limited to the LCD. The spatial light modulator in the optical system is alternatively a reflective spatial light modulator, for example, an LCoS, a DMD, or an MEMS.

In response to the optical system being used in an illumination scenario, both the first lens component and the second lens component are illumination lens components, and respectively project the first light beam to the first region to illuminate the region and project the second light beam to the second region to illuminate the region.

For example, the first lens component is a high-beam lens component, and the second lens component is a low-beam lens component. The light adjustment component dynamically adjusts a ratio of the first light beam and a ratio of the second light beam that are allocated to the high-beam lens component and the low-beam lens component, and directly allocates, through the first polarization beamsplitter mirror component, the first light beam and the second light beam to the high-beam lens component and the low-beam lens component for illumination, to implement dynamic brightness switching of a high beam.

For another example, in response to one lens of the plurality of lenses in the optical system projecting illumination light with a pattern, a spatial light modulator is added between the first polarization beamsplitter mirror component and the lens, so that the lens projects the illumination light with the pattern.

Figure 8:
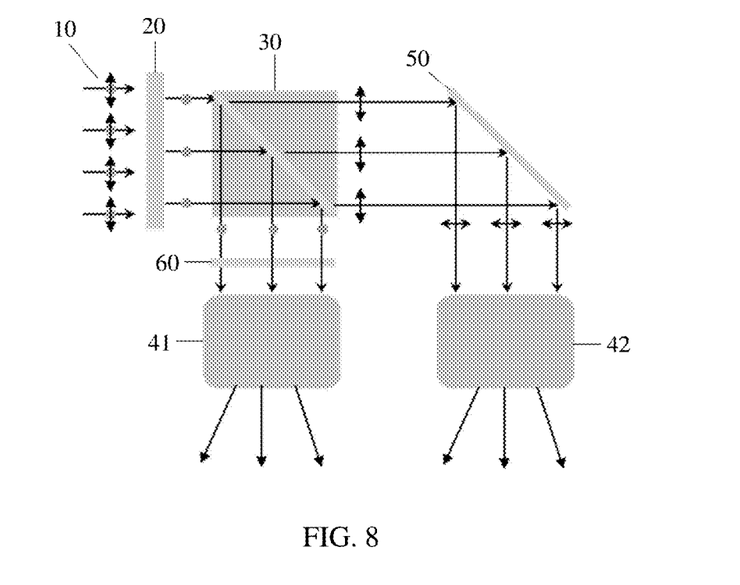
FIG. 8 is a schematic diagram of a structure of an optical system used in an illumination scenario according to at least one embodiment.

For example, as shown in FIG. 8, the optical system includes at least a light source component 10, a light adjustment component 20, a first polarization beamsplitter mirror component 30, a reflective element 50, an LCD 60, a first lens component 41, and a second lens component 42.

Both the first lens component 41 and the second lens component 42 are illumination lenses. The LCD 60 is configured on an optical path between the first polarization beamsplitter mirror component 30 and the first lens component 41, to modulate a first light beam. The first lens component 41 projects a modulated first light beam to a first region to form a first light distribution image. The reflective element 50 is configured between the first polarization beamsplitter mirror component 30 and the second lens component 42, and reflects a second light beam to the second lens component 42. The second lens component 42 projects the second light beam to a second region to illuminate the second region.

For another example, in response to the plurality of lenses in the optical system projecting illumination light with a pattern, a spatial light modulator is additionally arranged between each of the plurality of lenses and the first polarization beamsplitter mirror component, so that the plurality of lenses emit the illumination light with the pattern.

At least one embodiment further provides an illumination system, including any one of the optical systems described above.

At least one embodiment further provides a head-up display (head-up display, HUD) system, including any optical system described above and an imaging reflective mirror component. The imaging reflective mirror component is configured to reflect, to human eyes, the light beam generated by the optical system.

Figure 9:
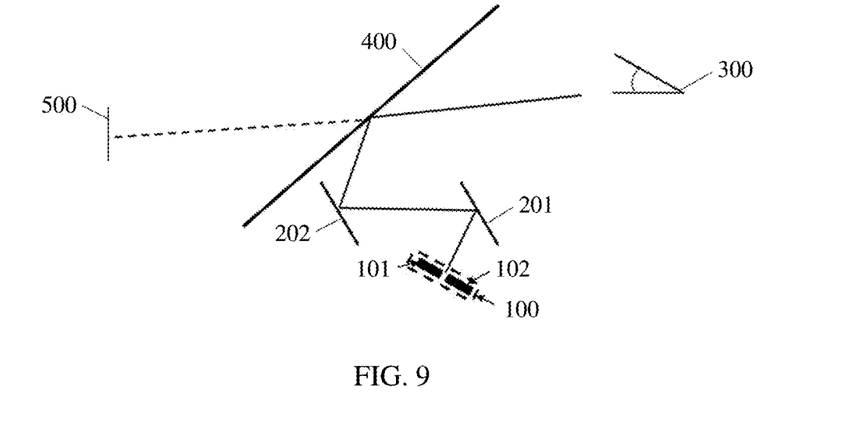
FIG. 9 is an imaging principle diagram of a head-up display system according to at least one embodiment.

For example, as shown in FIG. 9, the HUD system includes at least a picture generation unit 100 (picture generation unit, PGU) and an imaging reflective mirror component. The PGU 100 is implemented by using the optical system described above. The PGU 100 generates an image source. The imaging reflective mirror component includes a reflective mirror 201 and a reflective mirror 202, configured to reflect the image source generated by the PGU 100 to a windshield 400 (that is, a preset region) of a vehicle. Because of surface reflection of the windshield 400, a light beam of the image source is reflected to human eyes 300. In this way, for the human eyes 300, a scene of a virtual image 500 is displayed right ahead of the windshield 400. The HUD is used in a scenario in which a horizontal field of view covers more lanes, and a length-width ratio of a virtual image is greater than a conventional display ratio of 16:9. Therefore, display of a large length-width ratio is typically implemented by sacrificing a specific vertical resolution. The PGU in the HUD provided in at least one embodiment uses a dual-lens imaging solution, in which an image source 101 and an image source 102 with a typical 16:9 aspect ratio are spliced into an image source with a larger length-width ratio.

In dual-screen/multi-screen HUD display, a plurality of image sources 101 and image sources 102 are independently generated by using the PGU in the HUD provided in at least one embodiment, to implement HUD multi-screen display.

In 3D-HUD display, the PGU in the HUD provided in at least one embodiment is also used to generate a 3D image, to implement 3D-HUD display.

At least one embodiment further provides a display system, including any optical system described above and an imaging reflective mirror component. The imaging reflective mirror component is configured to reflect, to human eyes, the light beam generated by the optical system.

Figure 10:
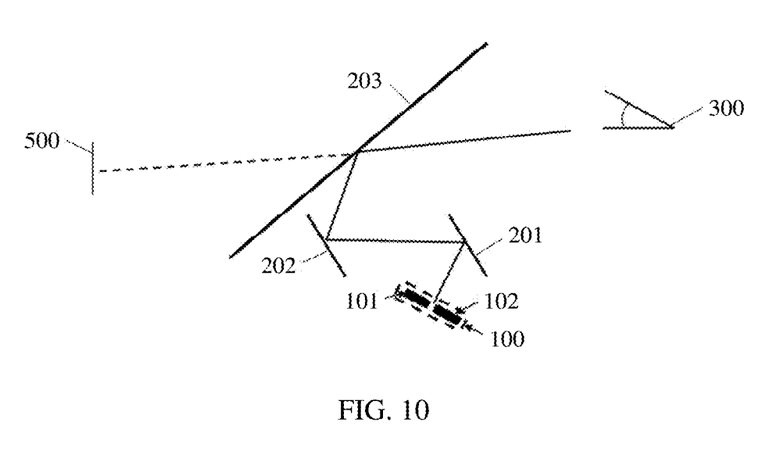
FIG. 10 is an imaging principle diagram of a display system according to at least one embodiment.

For example, as shown in FIG. 10, the display system includes at least a PGU 100, an imaging reflective mirror component, and a flat or a curved mirror 203. The PGU 100 is implemented by using the optical system described above. The PGU 100 generates an image source. The imaging reflective mirror component includes a reflective mirror 201 and a reflective mirror 202, and is configured to reflect the image source generated by the PGU 100 to the flat or the curved mirror 203 (that is, a preset region). Because of surface reflection of the flat or the curved mirror 203, a light beam of the image source is reflected to a position of human eyes 300. In this way, for the human eyes 300, a scene of a virtual image 500 is displayed right ahead of the flat or the curved mirror 203, and long-range imaging is implemented in a short range.

The PUG, that is, the optical system, in the display system provided in at least one embodiment uses a multi-lens imaging solution. An image source 101 and an image source 102 with a typical 16:9 aspect ratio are spliced into an image source with a larger length-width ratio, to display images with different length-width ratios at the virtual image 500.

The PUG in the display system provided in at least one embodiment generates a 3D image source, and after the 3D image source passes through an imaging system, a 3D effect is displayed at the human eyes 300.

At least one embodiment further provides a vehicle, including the illumination system, and/or the HUD, and/or the display system, and/or the optical system described above.

The vehicle includes, but is not limited to, an electric vehicle, a fuel vehicle, a construction vehicle, an agricultural vehicle, an aircraft, a ship, and other transportation vehicles. A vehicle-mounted HUD is in a communication connection to an advanced driving assistant system (Advanced Driving Assistant System, ADAS) of the vehicle. The HUD receives the driving assistant information input by the ADAS, such as information including a vehicle speed, navigation, and the like, generates an image by using the optical system (that is, the PGU), and then projects the image to a windshield to form a real image, or forms an enlarged virtual image for observation of human eyes in front of the vehicle by using a curved reflective mirror and the windshield, to provide a driving reference for a driver.

The vehicle-mounted HUD includes, but is not limited to, a C-HUD, a W-HUD, an AR-HUD, and other vehicle-mounted HUDs.

In the descriptions of at least one embodiment, specific features, structures, materials, or characteristics are combined in a proper manner in any one or more of embodiments or examples.

Finally, the foregoing embodiments are merely intended to describe the technical solutions of at least one embodiment, but not to limit embodiments described herein. Although at least one embodiment is described in detail herein, a person of ordinary skill in the art should understand that modifications is still made to the technical solutions described in the foregoing embodiments or equivalent replacements are made to some technical features, and such modifications and replacements do not cause the essence of the corresponding technical solutions to depart from the scope of the technical solutions of at least one embodiment.

What is claimed is:

1. An optical system, comprising:
   a light source component generating a light beam comprising S-polarized light and P-polarized light;
   a light adjustment component adjusting a ratio of the S-polarized light and/or a ratio of the P-polarized light in the light beam;
   a first polarization beamsplitter mirror component splitting a light beam adjusted by the light adjustment component into a first light beam and a second light beam, wherein the first light beam is a light beam of the S-polarized light, and the second light beam is a light beam of the P-polarized light;
   a first lens component projecting the first light beam or a modulated first light beam to a first region; and
   a second lens component projecting the second light beam or a modulated second light beam to a second region.

2. The optical system according to claim 1, wherein the light adjustment component changes a relative phase of the S-polarized light and the P-polarized light in the light beam, to adjust the ratio of the S-polarized light and/or the ratio of the P-polarized light in the light beam.

3. The optical system according to claim 1, wherein the light adjustment component includes at least a birefringent crystal rotatable around a rotation axis, wherein the rotation axis coincides with an optical axis of the light beam.

4. The optical system according to claim 3, wherein the birefringent crystal is a half-wave plate.

5. The optical system according to claim 1, wherein the optical system further includes a first spatial light modulator and a second spatial light modulator, wherein
   the first spatial light modulator modulates the first light beam;
   the first lens component projects the modulated first light beam to the first region to form a first image;

the second spatial light modulator modulates the second light beam; and the second lens component projects the modulated second light beam to the second region to form a second image.

6. The optical system according to claim 5, wherein the first region is adjacent to or partially overlaps the second region; and the first image and the second image are spliced to form a projection image.

7. The optical system according to claim 5, wherein the optical system further comprises a screen, wherein the first region and the second region are located in a same region of the screen; and the first image is a polarized light image for the left eye of a user, and the second image is a polarized light image for the right eye of the user.

8. The optical system according to claim 7, wherein the optical system further comprises a cylindrical lens component, and a focal plane of the cylindrical lens component coincides with a plane in which the screen is located.

9. The optical system according to claim 7, wherein the optical system further comprises a slit grating component, wherein a plane in which the slit grating component is located is parallel to a plane in which the screen is located, and there is a preset distance between the slit grating component and the screen, so that a first eye of the user sees the first image through a slit of the slit grating component, and a second eye of the user sees the second image through the slit of the slit grating component.

10. The optical system according to claim 5, wherein the first spatial light modulator and the second spatial light modulator are transmissive spatial light modulators; and a reflective element is arranged between the first polarization beamsplitter mirror component and the second spatial light modulator, and reflects the second light beam to the second spatial light modulator.

11. The optical system according to claim 5, wherein the first spatial light modulator and the second spatial light modulator are reflective spatial light modulators;

a light polarization direction conversion element and a second polarization beamsplitter mirror component are sequentially arranged between the first polarization beamsplitter mirror component and the second spatial light modulator;

the light polarization direction conversion element is configured to convert the second light beam from the P-polarized light to the S-polarized light; and the second polarization beamsplitter mirror component is configured to reflect the S-polarized light to the second spatial light modulator, and transmit the P-polarized light to the second lens component.

12. The optical system according to claim 11, wherein the light polarization direction conversion element is a half-wave plate.

13. The optical system according to claim 5 wherein the first spatial light modulator and the second spatial light modulator are reflective spatial light modulators;

a second polarization beamsplitter mirror component is arranged between the first polarization beamsplitter mirror component and the second spatial light modulator; and the second polarization beamsplitter mirror component transmits the second light beam to the second spatial light modulator, and reflects the modulated second light beam to the second lens component.

14. The optical system according to claim 1, wherein the first lens component is an illumination lens component, and projects the first light beam to the first region to illuminate the first region; and/or the second lens component is an illumination lens component, and projects the second light beam to the second region to illuminate the second region.

15. An illumination system, comprising:

a light source component generating a light beam comprising S-polarized light and P-polarized light;

a light adjustment component adjusting a ratio of the S-polarized light and/or a ratio of the P-polarized light in the light beam;

a first polarization beamsplitter mirror component splitting a light beam adjusted by the light adjustment component into a first light beam and a second light beam, wherein the first light beam is a light beam of the S-polarized light, and the second light beam is a light beam of the P-polarized light;

a first lens component projecting the first light beam or a modulated first light beam to a first region; and a second lens component projecting the second light beam or a modulated second light beam to a second region.

16. A display system, comprising an optical system and an imaging reflective mirror component, wherein the imaging reflective mirror component reflects, to a preset region, a light beam generated by the optical system, wherein the optical system comprising:

a light source component generating a light beam comprising S-polarized light and P-polarized light;

a light adjustment component adjusting a ratio of the S-polarized light and/or a ratio of the P-polarized light in the light beam;

a first polarization beamsplitter mirror component splitting a light beam adjusted by the light adjustment component into a first light beam and a second light beam, wherein the first light beam is a light beam of the S-polarized light, and the second light beam is a light beam of the P-polarized light;

a first lens component projecting the first light beam or a modulated first light beam to a first region; and a second lens component projecting the second light beam or a modulated second light beam to a second region.

17. The display system according to claim 16, wherein the imaging reflective mirror component includes a first reflective mirror element and a second reflective mirror element, and the first reflective mirror element and the second reflective mirror element are configured to reflect the light beam generated by the optical system to a surface of a windshield.

18. The display system according to claim 16, wherein the imaging reflective mirror component comprises a third reflective mirror element, a fourth reflective mirror element, and a curved mirror element, and the third reflective mirror element, the fourth reflective mirror element, and the curved mirror element reflect the light beam generated by the optical system to an eye of a user.

19. A vehicle, wherein the vehicle comprises:

a display system; and a windshield, wherein the windshield performs reflection imaging on a light beam generated by the display system, wherein the display system includes:

a light source component generating a light beam comprising S-polarized light and P-polarized light;

a light adjustment component adjusting a ratio of the S-polarized light and/or a ratio of the P-polarized light in the light beam;

a first polarization beamsplitter mirror component splitting a light beam adjusted by the light adjustment component into a first light beam and a second light beam, wherein the first light beam is a light beam of the S-polarized light, and the second light beam is a light beam of the P-polarized light;

a first lens component projecting the first light beam or a modulated first light beam to a first region; and a second lens component projecting the second light beam or a modulated second light beam to a second region.

20. The vehicle according to claim 19, wherein the light adjustment component changes a relative phase of the S-polarized light and the P-polarized light in the light beam, to adjust the ratio of the S-polarized light and/or the ratio of the P-polarized light in the light beam.

* * * * *